I. M. SCOTT.
Air-Valve.
No. 214,321.        Patented April 15, 1879.
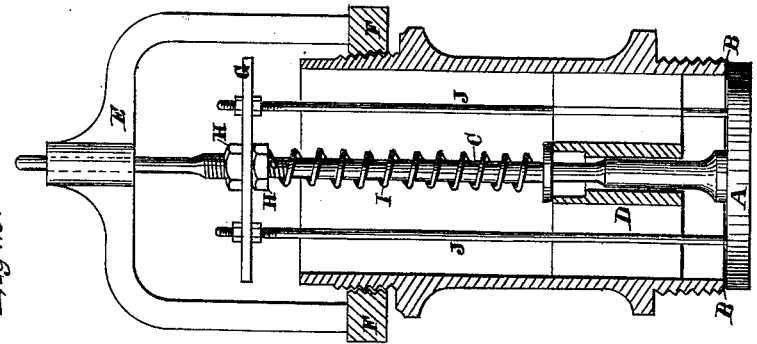
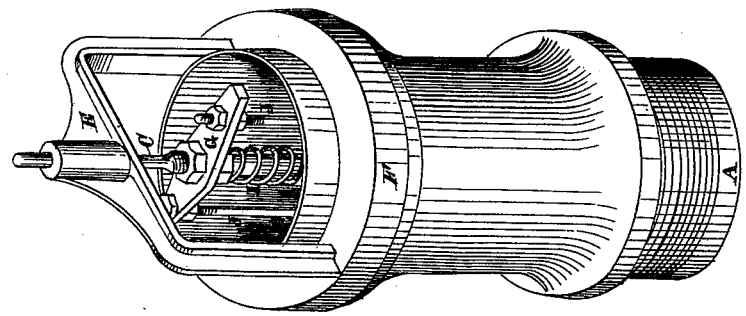

UNITED STATES PATENT OFFICE.

IRVING M. SCOTT, OF SAN FRANCISCO, CALIFORNIA.

IMPROVEMENT IN AIR-VALVES.

Specification forming part of Letters Patent No. 214,321, dated April 15, 1879; application filed February 19, 1879.

*To all whom it may concern:*

Be it known that I, IRVING M. SCOTT, of the city and county of San Francisco, and State of California, have invented an Improved Air-Valve; and I hereby declare the following to be a full, clear, and exact description thereof.

My invention relates to certain improvements in the mechanism which is employed to admit air to the cylinders of air-compressing engines; and it consists in the employment of a valve, in combination with safety-rods and a cross-head, by which the valve is prevented from falling into the cylinder in the event of the breakage of the valve stem or spindle.

It also consists in the use of an adjustable cross-head, in combination with the valve-seat, valve, and spindle, so that the opening of the valve may be controlled and regulated.

Referring to the accompanying drawings for a more complete explanation of my invention, Figure 1 is a view of my valve and seat. Fig. 2 is a longitudinal section of the same.

It is customary in the construction of the valves of air-compressors to make them conical and fitting into conical seats, and they are guided by the stem passing through one long or two short cross-bars within the valve-seat. This valve-seat rests upon flanges fitted to the outer and inner plates of the double cylinder-head, lying in a horizontal position. The objection is, that with use the guides will wear, and the valve will cease to stand parallel with the seat. Besides this, it will drop so as to be out of center, and the lower edge will come in contact with the seat before the upper edge does. This causes the valve to leak, and much of the efficiency of the compressor is thereby lost.

In my apparatus the valve A has its face turned up perfectly flat, and the end of the seat B, upon which it fits, is also turned flat, so that when the valve is closed the two faces will make a tight joint.

The stem or spindle C passes through a cross-bar or guide, D, within the elongated seat; and in order to separate the guides as much as possible and prevent irregular motion of the valve-stem and valve, I employ a yoke, E, which receives the outer end of the spindle and guides it. This yoke is formed with or secured to the ring or flange E, and spans the outer opening of the seat, as shown. The spindle or stem has screw-threads cut upon it, and a cross-head, G, is secured to the stem at this joint by nuts H. This cross-head may thus be moved and adjusted upon the stem. Its ends extend out far enough to strike the edges of the seat, and thus govern the opening of the valve. A spring, I, which surrounds the stem, serves to close the valve when the external pressure is removed.

One cause of serious trouble in air-compressors arises from the crystallization and final breaking off of the spindle or stem by the constant jar caused by the closing of the valve. The valve will in such a case fall into the cylinder, and will cause great damage.

In my invention I prevent this by means of the safety-rods J J, which have one end secured to the valve, while the other ends pass through the cross-head G, and are secured by nuts, as shown. These rods will support the valve, and will prevent its dropping into the cylinder if the stem breaks off. They may also assist in holding it to a position parallel with the face of the seat, so that it will always close squarely, and this will prevent strain upon the stem and lessen the chances of its being broken.

Having thus described my invention, what I claim as new, and desire to secure by Letters Patent, is—

1. The cross-head G, made adjustable upon the stem C, and having its ends projecting beyond the edges of the seat, so as to act as a stop and regulate the opening of the valve, substantially as herein described.

2. The safety-rods J J and the cross-head G, in combination with the valve A and stem of an air-compressor valve, substantially as and for the purpose herein described.

In witness whereof I have hereunto set my hand.

IRVING M. SCOTT.

Witnesses:
 GEORGE FREDRICKS,
 WILLIAM P. BARCLAY.